(12) United States Patent
Sutskover

(10) Patent No.: US 7,814,392 B2
(45) Date of Patent: Oct. 12, 2010

(54) SYSTEM, APPARATUS AND METHODS OF DYNAMICALLY DETERMINED ERROR CORRECTION CODES IN COMMUNICATION SYSTEMS

(75) Inventor: Ilan Sutskover, Hadera (IL)

(73) Assignee: Intel Corporation, Santa Clara, CA (US)

( * ) Notice: Subject to any disclaimer, the term of this patent is extended or adjusted under 35 U.S.C. 154(b) by 794 days.

(21) Appl. No.: 10/465,391

(22) Filed: Jun. 20, 2003

(65) Prior Publication Data
US 2004/0260998 A1 Dec. 23, 2004

(51) Int. Cl.
*H03M 13/00* (2006.01)
(52) U.S. Cl. ................... 714/758; 370/252; 714/752
(58) Field of Classification Search ........... 714/758, 714/801; 370/537, 242, 252; 375/295
See application file for complete search history.

(56) References Cited

U.S. PATENT DOCUMENTS

| | | | | |
|---|---|---|---|---|
| 4,701,923 | A * | 10/1987 | Fukasawa et al. | 714/774 |
| 5,490,168 | A * | 2/1996 | Phillips et al. | 375/224 |
| 6,473,442 | B1 * | 10/2002 | Lundsjo et al. | 370/537 |
| 6,542,736 | B1 * | 4/2003 | Parkvall et al. | 455/452.2 |
| 6,728,259 | B1 * | 4/2004 | Gronberg | 370/465 |
| 6,760,313 | B1 * | 7/2004 | Sindhushayana et al. | 370/252 |
| 6,895,547 | B2 * | 5/2005 | Eleftheriou et al. | 714/801 |
| 7,000,174 | B2 * | 2/2006 | Mantha et al. | 714/790 |
| 7,043,210 | B2 * | 5/2006 | Zhu et al. | 455/102 |
| 7,103,096 | B2 * | 9/2006 | Mitlin et al. | 714/748 |
| 7,120,856 | B2 * | 10/2006 | Zhang et al. | 714/801 |
| 2003/0058958 | A1 * | 3/2003 | Shokrollahi et al. | 375/295 |
| 2003/0063587 | A1 | 4/2003 | Cho et al. | |
| 2003/0081692 | A1 * | 5/2003 | Kwan et al. | 375/295 |
| 2004/0098659 | A1 * | 5/2004 | Bjerke et al. | 714/776 |
| 2004/0137932 | A1 * | 7/2004 | Agin | 455/522 |
| 2004/0148560 | A1 * | 7/2004 | Hocevar | 714/801 |

(Continued)

FOREIGN PATENT DOCUMENTS

EP 1 289 181 3/2003

OTHER PUBLICATIONS

International Search Report from PCT/US2004/013315, mailed on Oct. 18, 2004.

(Continued)

*Primary Examiner*—Sam Rizk
(74) *Attorney, Agent, or Firm*—Pearl Cohen Zedek Latzer, LLP

(57) ABSTRACT

A code designer unit may dynamically determine an error correction code having a performance for current conditions of a communication channel that substantially matches a current desired performance. The code designer unit may dynamically determine the error correction code at least by automatically estimating the performance of the code for the current channel conditions. Information relating to the error correction code may be provided to a transmitter code generator to generate a representation of the error correction code for encoding, and information relating to the error correction code may be provided to a receiver code generator to generate a representation of the error correction code for decoding. In the example of low-density parity-check codes, the information relating to the error correction code may be a common randomness source and definition of an ensemble of low-density parity-check codes an average performance of which substantially matches the current desired performance.

17 Claims, 5 Drawing Sheets

U.S. PATENT DOCUMENTS

| | | | |
|---|---|---|---|
| 2004/0160902 A1* | 8/2004 | Gronberg | 370/252 |
| 2004/0199859 A1* | 10/2004 | Matsumoto | 714/801 |
| 2004/0225950 A1* | 11/2004 | Siegel et al. | 714/801 |
| 2004/0242156 A1* | 12/2004 | Tiirola et al. | 455/25 |
| 2006/0013181 A1* | 1/2006 | Stolpman et al. | 370/342 |
| 2006/0182026 A1* | 8/2006 | Zhu et al. | 370/229 |

OTHER PUBLICATIONS

Office Action from the Patent Office of the State Intellectual Property Office of the People's Republic of China. Date of dispatch Sep. 5, 2008. Application No. 200480017138.7.

3GPP TS 25.214 V.5.3.0, Physical layer procedures (FDD), Release 5 (Dec. 2002).

Thomas J. Richardson and Rudiger L. Urbanke, "Efficient Encoding of Low-Density Parity-Check Codes", IEEE Transactions on information Theory, vol. 47, No. 2, pp. 638-656, Feb. 2001.

Thomas J. Richardson and Rudiger L. Urbanke, "The Capacity of Low-Density Parity-Check Codes under Message-Passing Decoding", IEEE Transactions on Information Theory, vol. 47, No. 2, Feb. 2001, pp. 599-614.

Thomas J. Richardson, M.A. Shokrollahi and R.L. Urbanke, "Design of Capacity-Approaching Irregular Low-Density Parity-Cheek Codes", IEEE Transactions on Information Theory, vol. 43, No. 2, pp. 619-637, Feb. 2001.

* cited by examiner

SYSTEM, APPARATUS AND METHODS OF DYNAMICALLY DETERMINED ERROR CORRECTION CODES IN COMMUNICATION SYSTEMS

BACKGROUND OF THE INVENTION

Error correction, using an error correction code, improves the reliability of communication systems and devices. In existing encoding methods, an encoder at the transmission end of a communication encodes an input word, for example, a block or vector of a given length, to produce a codeword of the error correction code. A decoder at the receiving end of the communication decodes a received word (block), yielding an estimation of the codeword that may indicate the original input word.

The rate of an error correction code is the ratio of the number of input bits to the number of output symbols. The better the channel conditions, the higher the code rate that can be used while still achieving an acceptable performance. Puncturing and/or repetition of a code with a given rate may achieve a different effective rate and may also yield a code of a different quality.

A conventional transmitter stores in its memory one or a small number of algorithms to produce codewords of a certain code, each code enabling a certain rate and a certain block length to be used. Additionally, a transmitter may use rate-matching techniques to implement puncturing and/or repetition to the output codewords produced by one of the algorithms.

A convention receiver stores in its memory one or a small number of decoding algorithms to decode codewords of a certain code, possibly after rate-matching techniques are used on the codewords of the certain code.

When a transmitter and a receiver communicate over a communication channel, coordination concerning the code used for the communication is desirable.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF THE INVENTION

In the following detailed description, numerous specific details are set forth in order to provide a thorough understanding of embodiments of the invention. However it will be understood by those of ordinary skill in the art that embodiments of the invention may be practiced without these specific details. In other instances, well-known methods, procedures, components and circuits have not been described in detail so as not to obscure the description of embodiments of the invention.

Figure 1:
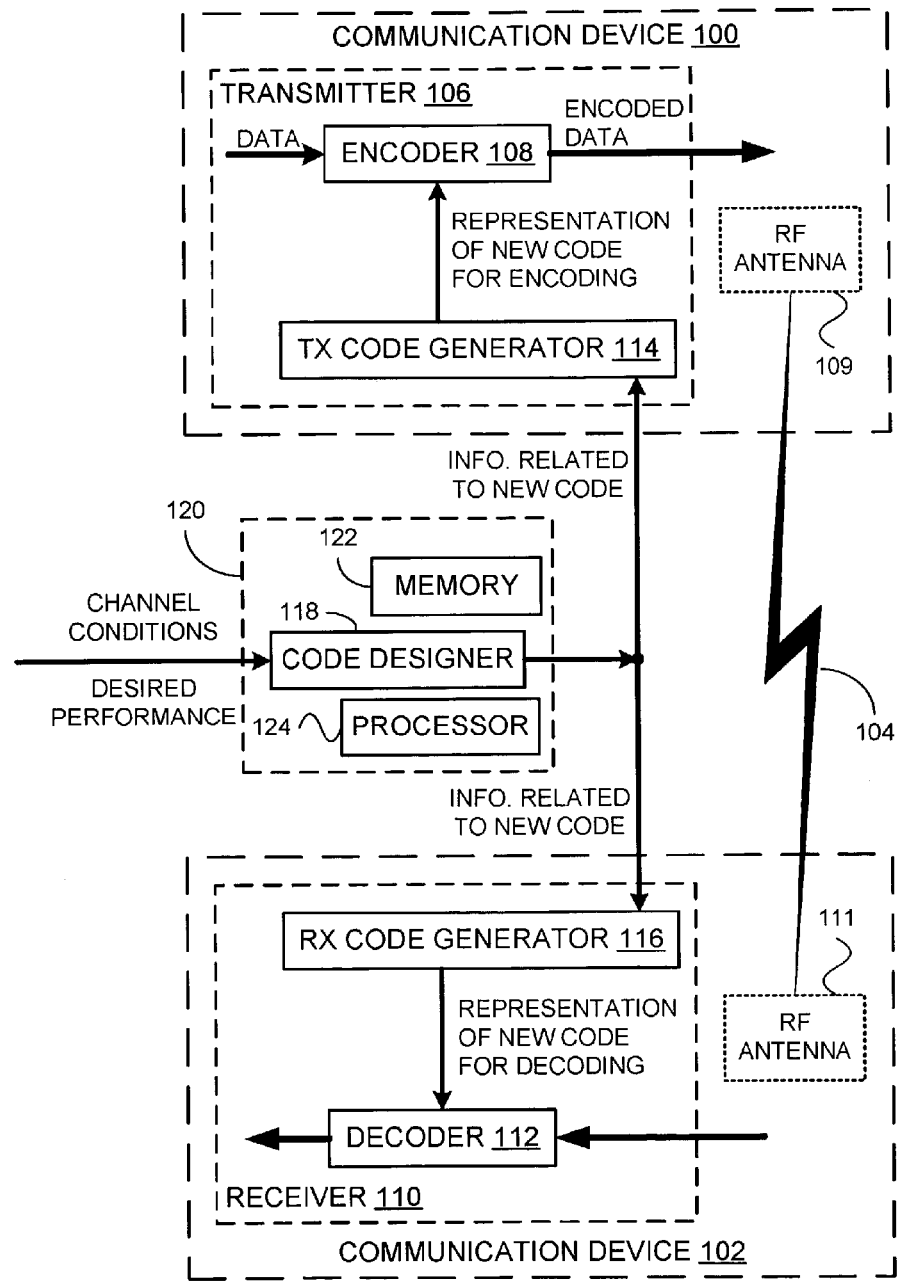
FIG. 1 is a simplified block-diagram illustration of an exemplary communication system including a code designer unit to dynamically determine a new error correction code.

FIG. 1 is a simplified block-diagram illustration of an exemplary communication system, in accordance with some embodiments of the invention. A communication device 100 is able to communicate with a communication device 102 over a communication channel 104.

Although the scope of the invention is not limited in this respect, communication devices 100, 102 may comprise wire or wireless or cable modems (not shown) of computers and communication channel 104 may be a wide-area-network (WAN), such as, for example, the Internet, or local-area-network (LAN). For example, the system may be a wireless LAN (WLAN) system or a digital subscriber line (DSL) system. Alternatively, although the scope of the invention is not limited in this respect, the communication system shown in FIG. 1 may be part of a cellular communication system, with one of communication devices 100, 102 being a base station and the other a mobile station or with both communication devices 100, 102 being mobile stations, a pager communication system, a personal digital assistant and a server, etc. In such cases, communication devices 100 and 102 may each comprise a radio frequency antenna. In particular, the communication system shown in FIG. 1 may be a $3^{rd}$ Generation Partnership Project (3GPP), such as, for example, Frequency Domain Duplexing (FDD) Wideband Code Division Multiple Access (WCDMA) cellular system and the like.

Communication device 100 may comprise a transmitter 106 that may comprise an encoder 108. Communication device 102 may comprise a receiver 110 that may comprise a decoder 112. Communication device 100 may optionally include a radio frequency antenna 109 and communication device 102 may optionally include a radio frequency antenna 111. Antennas 109 and 111 may be of any desired kind such as, but not limited to, dipole, Yagi and multi-pole and the like. Moreover, communication device 100 may comprise a receiver (not shown). Similarly, communication device 102 may comprise a transmitter (not shown).

Encoder 108 may encode data with an error correction code. A non-exhaustive list of examples of error correction codes includes convolutional codes, and block codes such as, for example, turbo codes and low-density parity-check (LDPC) codes, although other error correction codes may be used in conjunction with embodiments of the invention.

As is known in the art, the fraction of non-zero entries in the parity check matrix of a low-density parity-check (LDPC) code is small, namely strictly less than quadratic in the block length. In particular, the fraction of non-zero entries may be linear in the block length. One way of defining an LDPC ensemble is by the edge degree distributions of the bipartite graphs representing LDPC codes in the ensemble. In such bipartite graphs, the left nodes may represent the variables and the right nodes may represent the constraints, although the scope of the invention is not limited in this respect. For example, a particular LDPC ensemble may defined as a particular set of bipartite graphs where all the edges touch a left node of degree 3, 40% of the edges touch a right node of degree 5 and 60% of the edges touch a right node of degree 6, where the set is also endowed with a uniform probability distribution, as described in Thomas J. Richardson and Rüdiger L. Urbanke, "Efficient Encoding of Low-Density Parity-Check Codes", *IEEE Transactions on Information Theory*, Vol. 47, No. 2, pp. 638-656, February 2001.

Transmitter 106 may transmit the encoded data to receiver 110 via communication channel 104. Decoder 112 may decode the received encoded signal to extract the data or estimates of the data.

According to some embodiments of the invention, transmitter 106 may comprise a transmission (TX) code generator 114 to generate a representation of a code used for encoding. Although TX code generator 114 is shown in FIG. 1 as separate from encoder 108, in some embodiments of the invention, TX code generator 114 may be part of encoder 108.

According to some embodiments of the invention, receiver 110 may comprise a reception (RX) code generator 116 to generate a representation of a code used for decoding. Although RX code generator 116 is shown in FIG. 1 as separate from decoder 112, in some embodiments of the invention, RX code generator 116 may be part of decoder 112.

The representation of a code used for encoding may differ from the representation of the code used for decoding. For example, in the case of a linear block code, the parity-check matrix may be a sufficient representation of the code for decoding. In another example, a sufficient representation of a turbo code for encoding may include the generator, the interleaver and the puncturing mask. In a further example, in the case of an LDPC code, a set of matrices including those described in Thomas J. Richardson and Rüdiger L. Urbanke, "Efficient Encoding of Low-Density Parity-Check Codes", *IEEE Transactions on Information Theory*, Vol. 47, No. 2, pp. 638-656, February 2001 may be a sufficient representation of the code for encoding.

When a new error correction code is desired, a code designer unit 118 may provide TX code generator 114 and RX code generator 116 with information in order to enable TX code generator 114 and RX code generator 116 to generate code representations for the same new code. As shown in FIG. 1, code designer unit 118 may be separate from communication devices 100 and 102, and may be part of a device 120 having a memory 122 and a processor 124; in other embodiments of the invention, code designer unit 118 may be part of communication device 100 or part of communication device 102. For example, in the case of a cellular communication system, code designer unit 118 may be part of a base station, one of communication devices 100 and 102 may be a mobile station, and the other of communication devices 100 and 102 may be either the base station or another mobile station.

There are several different circumstances when a new code may be desired. For example, when channel conditions improve, a code with a higher rate than before may be appropriate. Similarly, when channel conditions deteriorate, a code with a lower rate than before may be appropriate. In another example, when the performance requirements change, a different code may be desired. It will be appreciated that the scope of the invention is in no way limited by these examples and that any criteria may be used to determine that a new code is desired. Moreover, any criteria may be used to determine which new code is desired; for example, a new code may be selected for having a current desired performance. The encoding and/or decoding complexity of a code may be a factor in determining a desired new code. Therefore, as shown in the exemplary flowchart of FIG. 2, code designer unit 118 may receive as input the current channel characteristics and current desired performance for a code (-200-).

Code designer unit 118 may use the input to determine the new code to be used by encoder 108 and decoder 112. Code designer unit 118 may consider codes of different rates and/or different block lengths in order to determine the new code. In the example of parallel concatenated turbo codes, code designer unit 118 may fix the convolutional generators and rate-matching policy and may consider codes that differ in their block lengths, code interleavers, and/or channel interleavers.

Code designer unit 118 may begin by considering an initial code (-202-). Code designer unit 118 may automatically estimate the performance of this code for the current channel conditions (-204-). For example, this estimation of the code's performance may include simulations or numerical calculations.

If the estimated performance of the code being considered does not substantially match the current desired performance (-206-), then code designer unit 118 may consider a different code (-208-) and may automatically estimate the performance of this different code for the current channel conditions (-204-). If the estimated performance of the code being considered substantially matches the current desired performance (-206-), code designer unit 118 may send information, including, for example, a definition of the code, to TX code generator 114 and RX code generator 116 (-208-). The information provided by code designer unit 118 may depend upon the type of error correction code and upon the methods employed by the code generators 114 and 116.

If code designer unit 118 is external to transmitter 106 and receiver 110, then this information may be provided to transmitter 106 and receiver 110 in one or more messages. If code designer unit 118 is internal to transmitter 106, then this information may be provided via a message from transmitter 106 to receiver 110. Similarly, if code designer unit 118 is internal to receiver 110, then this information may be provided via a message from receiver 110 to transmitter 106.

Figure 2:
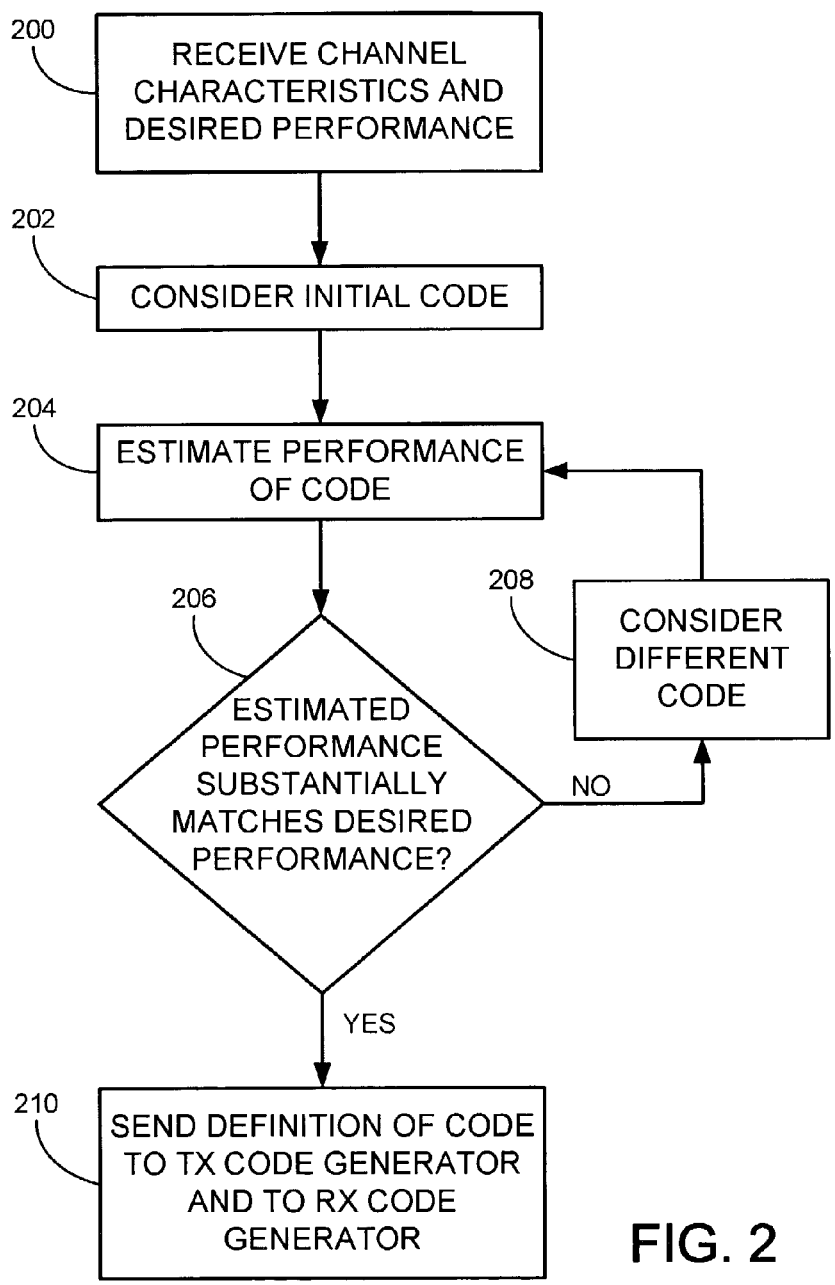
FIG. 2 is a flowchart illustration of an exemplary method to be performed by the code designer unit of the exemplary communication system of FIG. 1.

The method of FIG. 2 is to be performed by code designer unit 118 dynamically, for example, while communication over channel 104 is in progress. However, use of the new code by transmitter 106 and receiver 110 may be subject to other constraints. For example, transmitter 106 may delay use of the new code until transmission of an old block using the old code is finished.

Figure 3A:
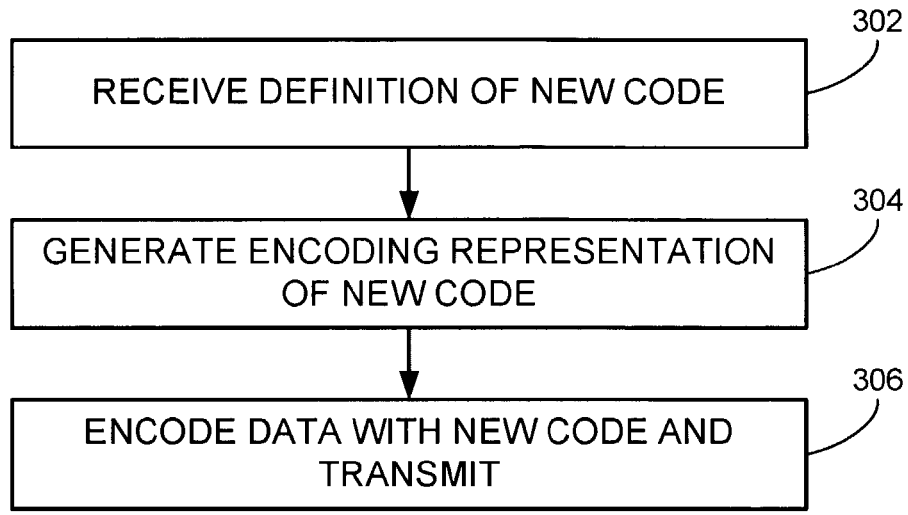
FIG. 3A is a flowchart illustration of an exemplary method to be performed by the transmitter of the exemplary communication system of FIG. 1.
Figure 3B:
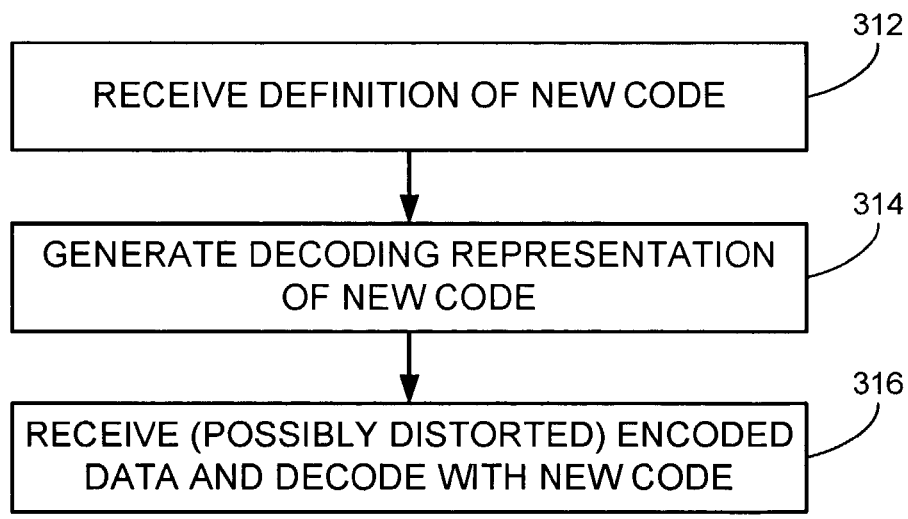
FIG. 3B is a flowchart illustration of an exemplary method to be performed by the receiver of the exemplary communication system of FIG. 1.

FIG. 3A is a flowchart illustration of an exemplary method to be performed by transmitter 106, and FIG. 3B is a flowchart illustration of an exemplary method to be performed by receiver 110. TX code generator 114 and RX code generator 116 may each receive the definition of the new code (-302- and -312-).

Then TX code generator 114 may generate a representation of the new code for encoding (-304-), and RX code generator 116 may generate a representation of the new code for decoding (-314-).

The methods implemented by TX code generator 114 and RX code generator 116 may be implemented in software, hardware, firmware or any combination thereof.

Encoder 108 may encode data using the code representation for encoding generated by TX code generator 114 for the new code (-306-), and transmitter 106 may transmit the encoded data to receiver 110 via communication channel 104.

Receiver 110 may receive the possibly distorted encoded data, and decoder 112 may decode the encoded data using the code representation for decoding generated by RX code generator 116 for the new code (-316-).

Figure 4:
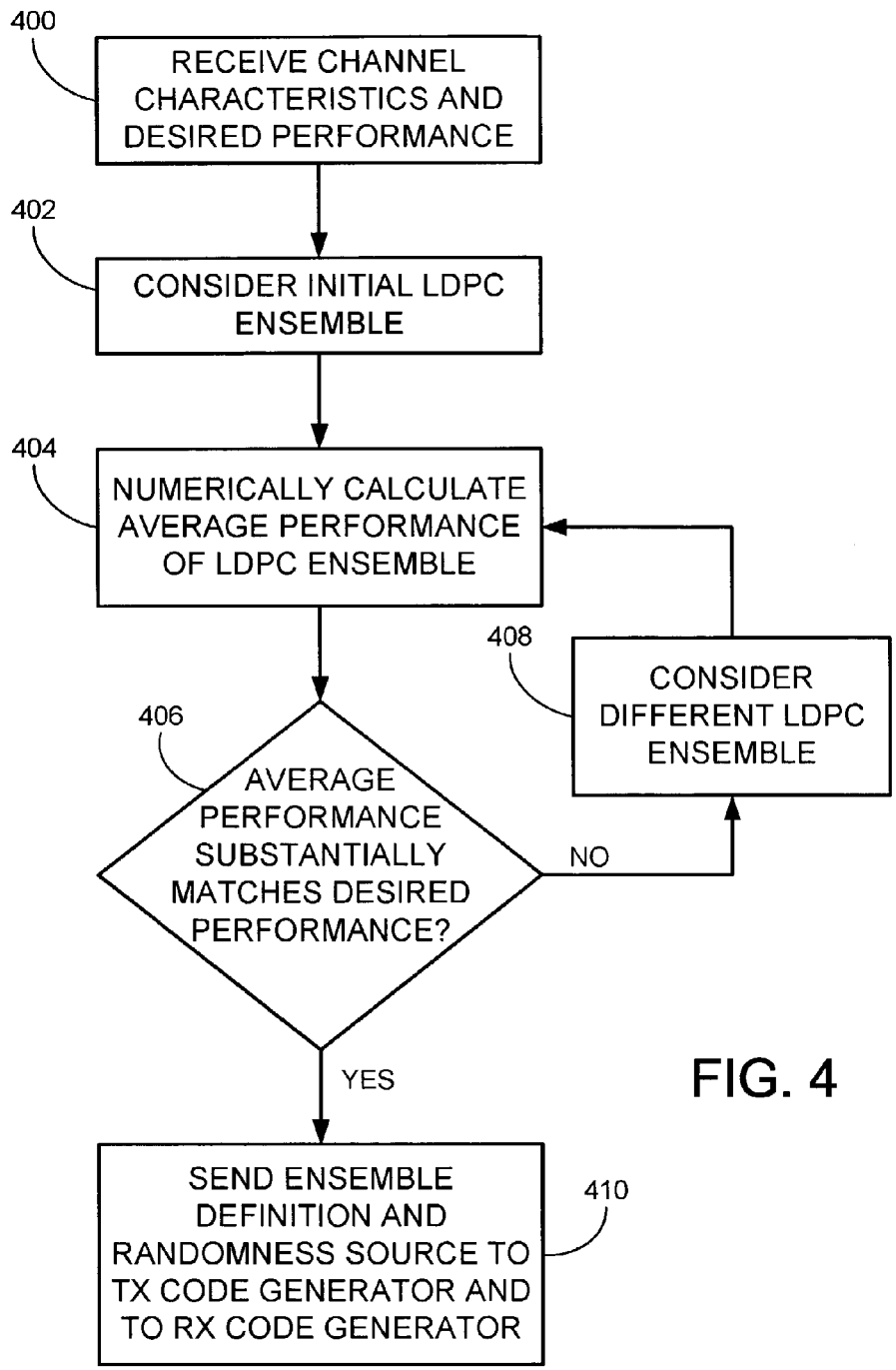
FIG. 4 is a flowchart illustration of an exemplary method to be performed by a code designer unit that designs low-density parity-check (LDPC) codes using ensembles.

FIG. 4 is a flowchart illustration of an exemplary method to be performed by code designer unit 118 for the particular example of low-density parity-check codes. Code designer unit 118 may receive as input the current channel characteristics and current desired performance for a code (-400-).

Code designer unit 118 may consider an initial LDPC ensemble (-402-). For example, given a desired rate r that can be expressed as 1−a/b, the initial LDPC ensemble may be an ensemble of regular LDPC codes represented by the set of bipartite graphs where all the edges touch a left node of degree a and all the edges touch a right node of degree b, and where the set is also endowed with a uniform probability distribution. The block length of the initial code may be determined from other criteria such as, for example, the permissible latency of decoding.

Code designer unit 118 may automatically estimate the average performance of this LDPC ensemble for the current channel conditions (-404-). For example, this estimation of the average performance of the LDPC ensemble may include numerical calculations, such as, for example, those described in Richardson and Urbanke, "The Capacity of Low-Density Parity-Check Codes under Message-Passing Decoding", *IEEE Transactions on Information Theory*, Vol. 47, No. 2, February 2001. If the estimated average performance of the LDPC ensemble being considered does not substantially match the current desired performance (-406-), then code designer unit 118 may consider a different LDPC ensemble (-408-) and may automatically estimate the performance of this different LDPC ensemble for the current channel conditions (-404-).

Any suitable test may be used at -406- to determine whether the estimated average performance of the LDPC ensemble being considered substantially matches the current desired performance. For example, the numerical technique known as "density evolution" (which is explained in Richardson and Urbanke, "The Capacity of Low-Density Parity-Check Codes under Message-Passing Decoding", *IEEE Transactions on Information Theory*, Vol. 47, No. 2, February 2001) checks for zero-bit-error-probability at infinite block length. An optimization algorithm may search, for example, for the lowest signal-to-noise ratio (SNR) for an approximately zero zero-bit-error-probability, or for the closest rate to a requirement for a given SNR, or the like.

For LDPC ensembles defined by edge degree sequences (left and right), the different LDPC ensemble (of -408-) and its estimated performance (-404-) may be determined using the following "steepest descent" approach, described in T. J. Richardson, M. A. Shokrollahi and R. L. Urbanke, "Design of Capacity-Approaching Irregular Low-Density Parity-Check Codes", *IEEE Transactions on Information Theory*, Vol. 43, No. 2, pp. 619-637, February 2001. The performance of such LDPC ensembles (i.e. those defined by edge degree sequences) is a function of these sequences. Therefore, slight perturbations to the sequences will enable an evaluation of the performance of "neighbor" ensembles (in the sense of close values of degree sequences). The neighbor ensemble with the best average performance may be chosen and this process may be continued iteratively until convergence to an ensemble having an average performance better than that of its neighbors occurs. Alternatively, a different optimization approach may be used.

It is known in the art that the performance of a single uniformly drawn code over an ensemble of LDPC codes is very close in probability to the average performance of the ensemble. This is described, for example, in Richardson and Urbanke, "The Capacity of Low-Density Parity-Check Codes under Message-Passing Decoding", *IEEE Transactions on Information Theory*, Vol. 47, No. 2, February 2001. Therefore, once code designer unit 118 determines an LDPC ensemble whose average performance substantially matches the current channel conditions and the current desired performance, most LDPC codes randomly drawn over this ensemble will have a performance that substantially matches the current channel conditions and the current desired performance.

If the estimated average performance of the LDPC ensemble being considered substantially matches the current desired performance (-406-), code designer unit 118 may send information, including, for example, a definition of the LDPC ensemble, a block length (if it is not fixed) and a randomness source, to TX code generator 114 and RX code generator 116 (-410-).

The methods of FIGS. 2 and 4 may be implemented by code generator 118 in software, hardware, firmware or any combination thereof. If implemented in software, the code for the method may be stored in memory 122 of FIG. 1 and executed by processor 124.

Figure 5A:
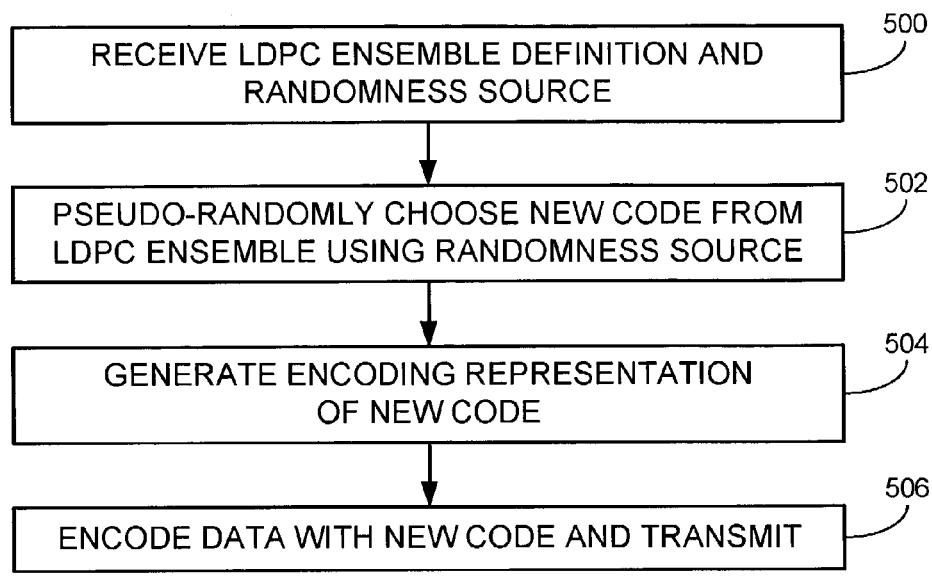
FIG. 5A is a flowchart illustration of an exemplary method to be performed by the transmitter of an exemplary communication system having a code designer unit that designs LDPC codes using ensembles.
Figure 5B:
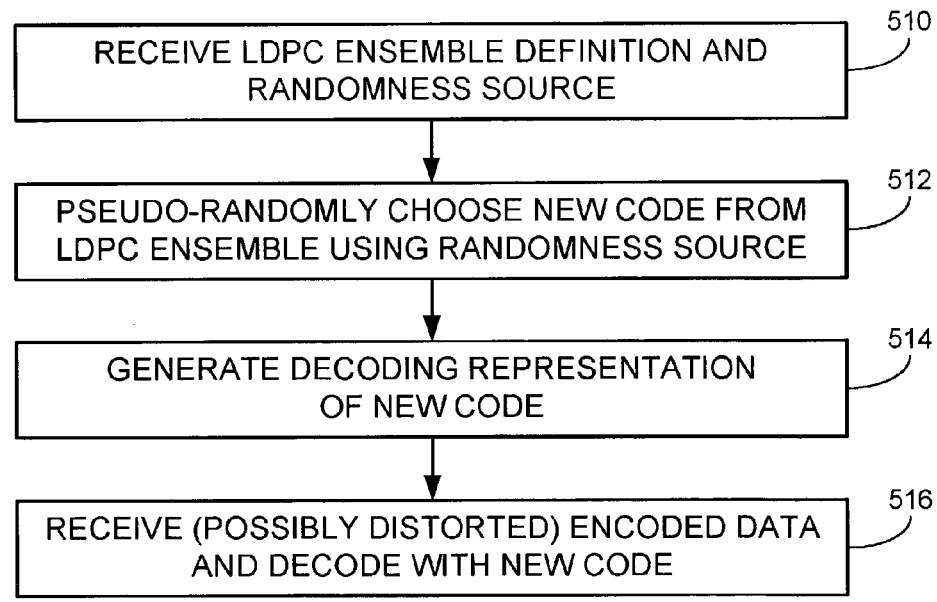
FIG. 5B is a flowchart illustration of an exemplary method to be performed by the receiver of the exemplary communication system having a code designer unit that designs LDPC codes using ensembles.

FIG. 5A is a flowchart illustration of an exemplary method to be performed by transmitter 106, and FIG. 5B is a flowchart illustration of an exemplary method to be performed by receiver 110. TX code generator 114 and RX code generator 116 may each receive the definition of the ensemble of LDPC codes, the block length and the randomness source (-500- and -510-).

The randomness source is to be used by TX code generator 114 and RX code generator 116 for the pseudo-random drawing of the code over the ensemble to ensure that both TX code generator 114 and RX code generator 116 draw the same code from the ensemble (-502- and -512-). For example, the common randomness source may take the form of a seed for a pseudo-random number generator. The seed may be chosen by code designer unit 118 from a prestored list or may itself be generated by a pseudo-random sequence generator or by trial and error, although the scope of the invention is not limited in this respect.

Then TX code generator 114 may generate a representation of the new code for encoding (-504-), and RX code generator 116 may generate a representation of the new code for decoding (-514-). Richardson and Urbanke, "The Capacity of Low-Density Parity-Check Codes under Message-Passing Decoding", describes a method to randomly generate a parity-check matrix of an LDPC code belonging to an ensemble. It is known in the art how to generate encoding representations of an LDPC code from the parity-check matrix. Moreover, the parity-check matrix itself is a decoding representation of an LDPC code.

The methods implemented by TX code generator 114 and RX code generator 116 may be implemented in software, hardware, firmware or any combination thereof.

Encoder 108 may encode data using the code representation for encoding generated by TX code generator 114 for the new code (-506-), and transmitter 106 may transmit the encoded data to receiver 110 via communication channel 104.

Receiver 110 may receive the possibly distorted encoded data, and decoder 112 may decode the encoded data using the code representation for decoding generated by RX code generator 116 for the new code (-516-).

As long as the current code is satisfactory, encoder 108 and decoder 112 may continue to use it. However, if a new code is desired, then a method similar to those of FIG. 2 and FIG. 4 may be performed.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:
pseudo-randomly choosing an error correction code from an ensemble of low-density parity-check codes using a randomness source;
estimating a performance of said error correction code for current conditions of a communication channel;
if said estimated performance substantially matches a current desired performance, providing information including definition of said ensemble, a block length and said randomness source to a transmitter and a receiver currently communicating over said channel for dynamically generating, based on said information, representations of said error correction code at said transmitter and at said receiver for encoding and decoding future communications on said channel.

2. The method of claim 1, comprising:
selecting the ensemble of low-density parity-check codes having an average performance that substantially matches said current desired performance.

3. An article comprising a machine-readable storage medium having stored thereon instructions that, when executed by a processing platform, result in:
pseudo-randomly choosing an error correction code from an ensemble of low-density parity-check codes using a randomness source;
estimating a performance of said error correction code for current conditions of a communication channel;
if said estimated performance substantially matches a current desired performance, providing information including definition of said ensemble, a block length and said randomness source to a transmitter and a receiver currently communicating over said channel for dynamically generating, based on said information, representations of said error correction code at said transmitter and at said receiver for encoding and decoding future communications on said channel.

4. The article of claim 3, wherein said instructions, when executed by the processing platform, result in selecting the ensemble of low-density parity-check codes having an average performance that substantially matches said current desired performance.

5. An article comprising a machine-readable storage medium having stored thereon instructions that, when executed by a processing platform, result in:
receiving information regarding an error correction code pseudo-randomly chosen from an ensemble of low-density parity-check codes using a randomness source, the information including definition of said ensemble, a block length and said randomness source, the error correction code having an estimated performance for current conditions of a communication channel that substantially matches a current desired performance; and
dynamically generating a representation of said error correction code based on said information for encoding data to be transmitted over said communication channel.

6. An article comprising a machine-readable storage medium having stored thereon instructions that, when executed by a processing platform, result in:
receiving information regarding an error correction code pseudo-randomly chosen from an ensemble of low-density parity-check codes using a randomness source, the information including definition of said ensemble, a block length and said randomness source, the error correction code having an estimated performance for current conditions of a communication channel that substantially matches a current desired performance; and
dynamically generating a representation of said error correction code based on said information for decoding encoded data received over said communication channel.

7. An apparatus comprising:
a code designer unit to estimate a performance of an error correction code pseudo-randomly chosen from an ensemble of low-density parity-check codes using a randomness source, for current conditions of a communication channel and, if said estimated performance substantially matches a current desired performance, to provide information including definition of said ensemble, a block length and said randomness source to a transmitter and a receiver currently communicating over said channel for dynamically generating, based on said information, representations of said error correction code at said transmitter and at said receiver for encoding and decoding future communications on said channel.

8. The apparatus of claim 7, wherein said code designer unit is to select the ensemble having an average performance that substantially matches said current desired performance.

9. A communication device comprising:
a dipole antenna to send and receive signals over a communication channel; and
a code designer unit to estimate a performance of an error correction code pseudo-randomly chosen from an ensemble of low-density parity-check codes using a randomness source, for current conditions of said communication channel and, if said estimated performance substantially matches a current desired performance, to provide information including definition of said ensemble, a block length and said randomness source to a transmitter and a receiver currently communicating over said channel.

10. The communication device of claim 9, further comprising:
a code generator within said transmitter to dynamically generate, based on said information, a representation of said error correction code for encoding data to be transmitted over said communication channel via said dipole antenna.

11. The communication device of claim 9, further comprising:
a code generator within said receiver to dynamically generate, based on said information, a representation of said error correction code for decoding encoded data to be received over said communication channel via said dipole antenna.

12. A communication system comprising:
a first communication device and a second communication device to communicate with each other over a communication channel; and
a code designer unit to estimate a performance of an error correction code pseudo-randomly chosen from an ensemble of low-density parity-check codes using a randomness source, for current conditions of said communication channel and, if said estimated performance substantially matches a current desired performance, to provide information including definition of said ensemble, a block length and said randomness source to said first and second communication devices.

13. The communication system of claim 12, wherein said first communication device comprises a transmitter, wherein said second communication device comprises a receiver, and wherein the transmitter and the receiver include a code generator to dynamically generate, based on said information, a representation of said error correction code for encoding and decoding communications over said channel, respectively.

14. The communication system of claim 12, wherein said code designer unit is part of one of said first communication device and said second communication device.

15. A computer comprising:
   a modem to enable communication with a network; and
   a code designer to estimate a performance of an error correction code pseudo-randomly chosen from an ensemble of low-density parity-check codes using a randomness source, for current conditions of said network, and, if said estimated performance substantially matches a current desired performance, to provide information including definition of said ensemble, a block length and said randomness source to said modem.

16. The computer of claim 15, further comprising:
   a code generator to dynamically generate, based on said information, a representation of said error correction code for encoding data to be transmitted over said network via said modem.

17. The computer of claim 15, further comprising:
   a code generator to dynamically generate, based on said information, a representation of said error correction code for decoding encoded data to be received over said network via said modem.

* * * * *